(12) United States Patent
Meskin et al.

(10) Patent No.: US 9,840,286 B2
(45) Date of Patent: Dec. 12, 2017

(54) FRONT END MODULE FOR A VEHICLE

(71) Applicant: Valeo North America, Inc., Troy, MI (US)

(72) Inventors: Issmail Meskin, Le Mesnil Saint-Denis (FR); Antonio Babler, Le Mesnil Saint Denis (FR)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/042,878

(22) Filed: Feb. 12, 2016

(65) Prior Publication Data
US 2017/0233011 A1    Aug. 17, 2017

(51) Int. Cl.
*B62D 25/08* (2006.01)
*B60R 19/52* (2006.01)
*B60K 11/04* (2006.01)

(52) U.S. Cl.
CPC ............ *B62D 25/084* (2013.01); *B60K 11/04* (2013.01); *B60R 19/52* (2013.01); *B62D 25/085* (2013.01)

(58) Field of Classification Search
CPC ....... B60K 11/04; B60R 19/023; B60R 19/34; B60R 21/34; B62D 25/084; B62D 25/085

USPC .............. 296/29, 30, 187.09, 193.04, 193.09
See application file for complete search history.

(56) References Cited

U.S. PATENT DOCUMENTS

| | | | | |
|---|---|---|---|---|
| 6,866,333 B2* | 3/2005 | Saitou | ................. | B62D 25/084 293/155 |
| 7,419,208 B2* | 9/2008 | Sub | ...................... | B62D 25/084 296/193.09 |
| 9,211,859 B1* | 12/2015 | Stoenescu | ............... | B60R 19/34 |
| 9,522,649 B2* | 12/2016 | Cha | .......................... | B60R 21/34 |
| 2006/0009088 A1* | 1/2006 | Uchiyama | .............. | B62D 27/06 439/821 |
| 2016/0236562 A1* | 8/2016 | Iwamoto | ................ | B60K 11/04 |

FOREIGN PATENT DOCUMENTS

DE        102004030794 A1 *   1/2006   ............. B60R 19/12

* cited by examiner

*Primary Examiner* — Jason S Daniels
(74) *Attorney, Agent, or Firm* — Osha Liang LLP (57) ABSTRACT

A front end module of a vehicle, including a first side member having a first impact portion and a first other portion, a second side member having a second impact portion and a second other portion, and a lower cross member connecting the first side member with the second side member, is disclosed. The first side member and the second side member are each bent towards a front end of the vehicle, and each of the first side member and the second side member is J-shaped.

20 Claims, 11 Drawing Sheets

FRONT END MODULE FOR A VEHICLE

BACKGROUND

Front end modules are complex assembly units disposed on vehicles—these modules are often required to be highly functional, compact, and aesthetically pleasing. Depending on the specific vehicle model, visible portions may include the headlights, the bumpers, and the front grill. Located behind these visible portions may be a cooling module, washer tank, motor fan, condenser, electrical wiring, engine cooling and crash management system, etc.

SUMMARY

In general, in one aspect, one or more embodiments disclosed herein relate to a front end module of a vehicle, comprising: a first side member having a first impact portion and a first other portion; a second side member having a second impact portion and a second other portion; and a lower cross member connecting the first side member with the second side member, wherein the first side member and the second side member are each bent towards a front end of the vehicle, and wherein each of the first side member and the second side member is J-shaped.

In another aspect, one or more embodiments disclosed herein relate to a front end module of a vehicle, comprising: a first side member and a second side member; a lower cross member connecting the first side member with the second side member; a first metal plate covering a connection region comprising a portion of the first side member and a portion of the lower cross member; and a second metal plate covering a connection region comprising a portion of the second side member and a portion of the lower cross member, wherein the first side member and the second side member are each bent towards a front end of the vehicle.

In yet another aspect, one or more embodiments disclosed herein relate to a front end module of a vehicle, comprising: a first side member and a second side member; a lower cross member connecting the first side member with the second side member; an extension connecting to and forming a surface with the lower cross member; and a cooling module disposed on the extension, wherein the first side member and the second side member are each bent towards a front end of the vehicle, and wherein the lower cross member is a bent beam having at least two bent portions that are bent towards the front end.

Other aspects and advantages of the invention will be apparent from the following description and the appended claims.

DETAILED DESCRIPTION

Specific embodiments will now be described in detail with reference to the accompanying figures. Like elements in the various figures are denoted by like reference numerals for consistency. Like elements may not be labeled in all figures for the sake of simplicity.

In the following detailed description, numerous specific details are set forth in order to provide a more thorough understanding of one or more embodiments of the invention. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a lower cross member" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
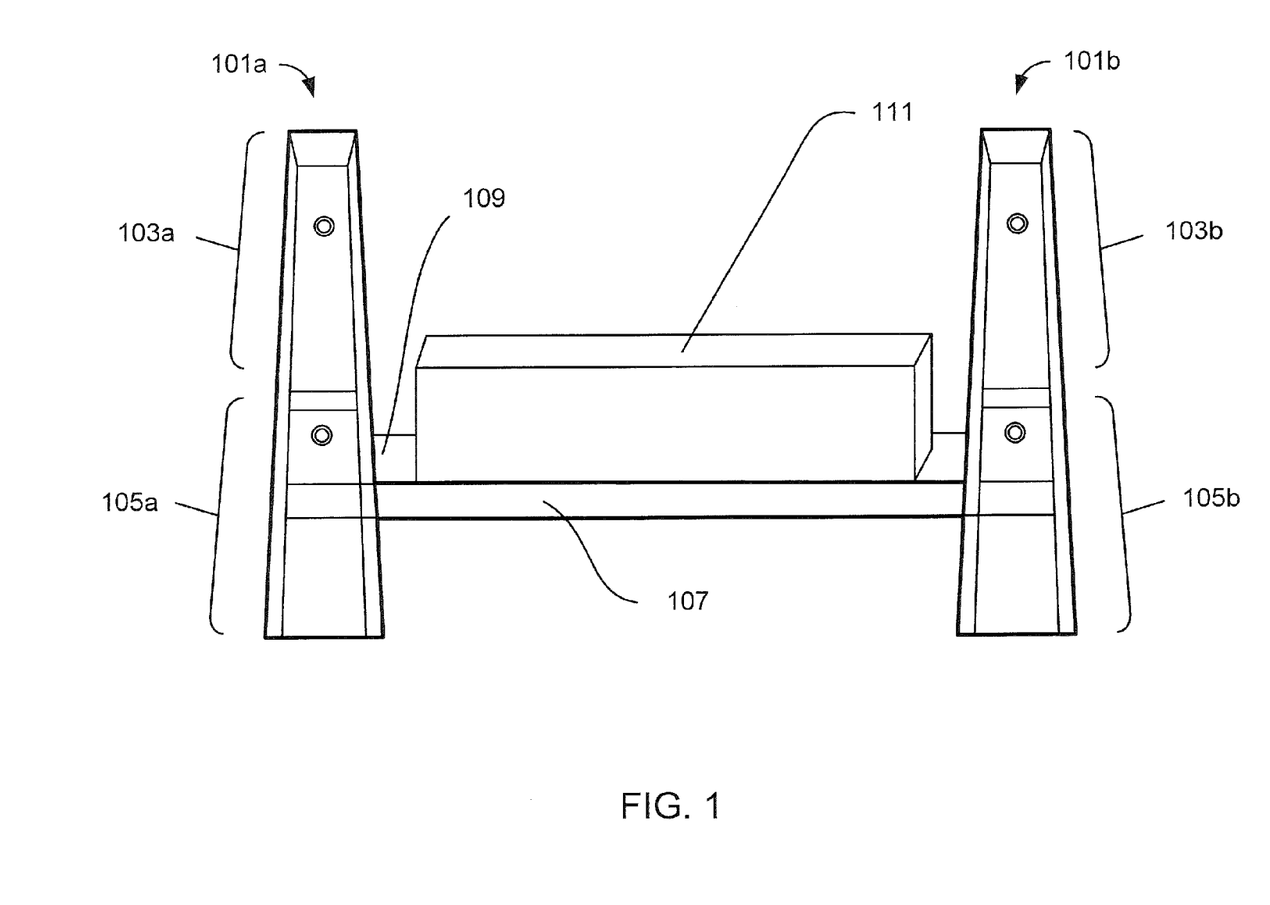
FIG. 1 shows a front end module according to one or more embodiments of the invention.

FIG. 1 shows a front end module according to one or more embodiments of the invention. The front end module may be of varying sizes, shapes, and forms depending on the vehicles to be fitted. The front end module, as shown in FIG. 1, has multiple components including a front end carrier and a cooling module (111). Each of these components is described below. Although not explicitly shown, one of ordinary skill in the art would appreciate that headlight mounts, engine housing, motor fan, condenser, radiator, washer tank, electrical wiring structures, etc., may also be part of the front end module.

In one or more embodiments, the front end carrier comprises first and second side members (101a, 101b), a lower cross member (107) having an extension (109), and an upper cross member (not shown). Those skilled in the art would appreciate that the combination of the first side member (101a), the second side member (101b), and the lower cross member (107) may be collectively referred to as a bolster.

In one or more embodiments, the two side members (101a, 101b) may be made of any sturdy material including metals and alloys (e.g., steel, aluminum, etc.). The first and second side members (101a, 101b) may be of any shape so long as each has an impact portion and an other portion. Specifically, the impact portion is designed such that it absorbs the most force during an impact, whereas the other portion is designed to maintain the structural integrity of the front end carrier. In a non-limiting example, the shape of the first and second side members (101a, 101b) may be J-shaped. In this example, the hook portion of the J-shaped side member would be considered the impact portion, whereas the straight portion of the J-shaped side members would be considered the other portion. The first and second side members (101a, 101b) may or may not be hollow. As shown in FIG. 1, these side members (101a, 101b) are not hollow, but may comprise through holes to enable connection with other components of the vehicle.

As also shown in FIG. 1, the first and second side members (101a, 101b) may or may not be substantially parallel to one another and may be connected to one another via a substantially horizontal lower cross member (107) that intersects the first and second side members (101a, 101b) in a substantially perpendicular manner. As with the two side members, the lower cross member (107) may be made of any materials (e.g., aluminum, steel, etc.) capable of providing a sturdy front end carrier that withstands impact or minimizes damages to other components of the front end module. For example, the lower cross member (107) may be made of any metals or alloys. The lower cross member (107) may connect to the first and second side members (101a, 101b) using any means, including a female-male joint, screws, welding, etc.

In one or more embodiments, the extension (109) is a metal or alloy plate configured to support components of the front end module, including the cooling module (111). The extension (109) may connect to the lower cross member from a side surface (not shown) using any means, including a female-male joint, screws, welding, etc. When connected to the lower cross member (107), the extension (109), as shown in FIG. 1, may form a single flat surface with the lower cross member. The extension may be configured to carry just the cooling module (111) or carry also other components including a washer tank, water and oil pumps, coolant tubes, clutch system, clutch lines, turbochargers, powertrain systems, electronic systems, wiring structures, etc.

In one or more embodiments, the cooling module (111) may comprise an A/C compressor, electric add heaters, fans, filters, condenser, radiator assembly, etc. The cooling module (111) may be disposed on the lower cross member (107), the extension (109), or both.

Those skilled in the art will appreciate that while FIG. 1 shows a particular configuration for the front end module, the invention is not limited thereto. Specifically, one of ordinary skill in the art would appreciate that, depending on the specific vehicles to be fitted, the component placements may be rearranged, the various components may contact one another either directly or indirectly, and the materials used for each components may differ.

Figure 2A:
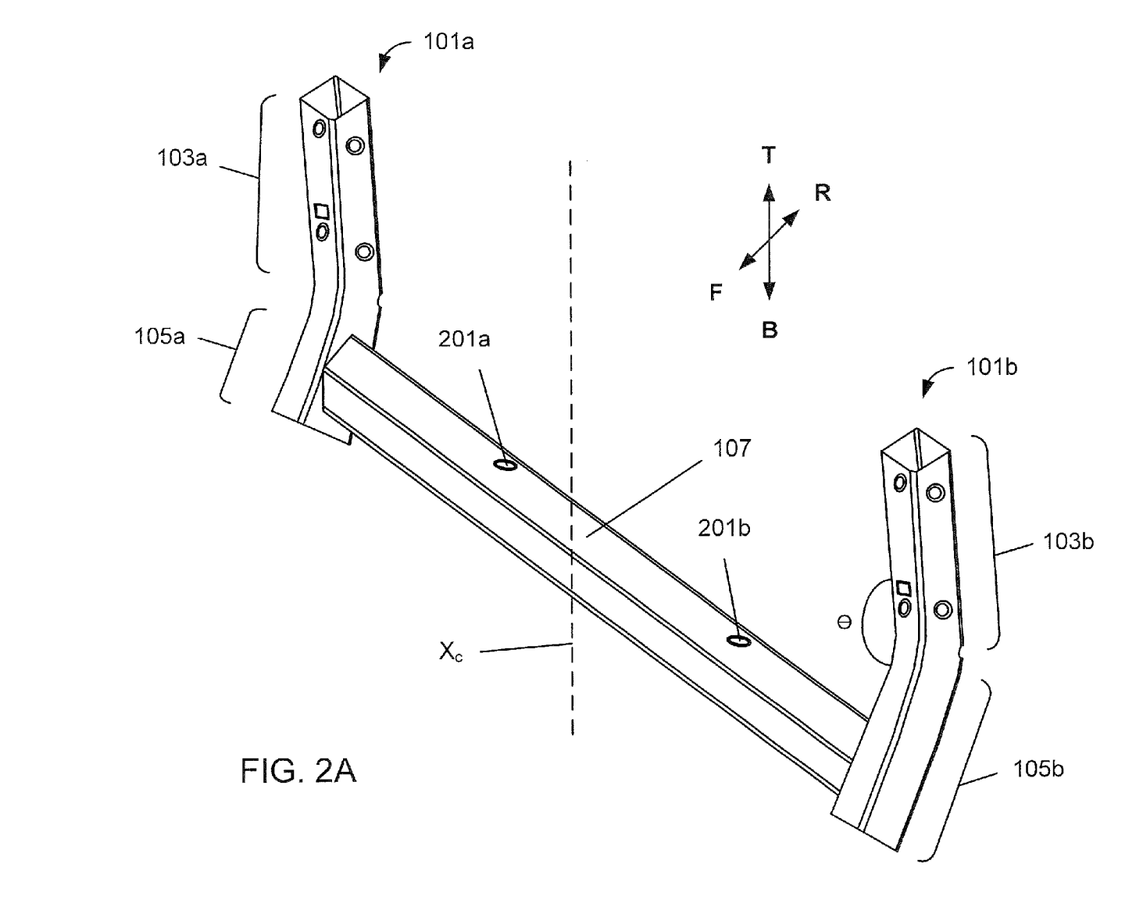
FIG. 2A shows a front end carrier according to one or more embodiments of the invention.

FIG. 2A shows a front end carrier according to one or more embodiments of the invention. Specifically, FIG. 2A shows a front end carrier having a first side member (101a), a second side member (101b), and a lower cross member (107). As discussed above, although the side members need not be J-shaped, each of the first and second side members (101a, 101b) has an impact portion (105a, 105b) and an other portion (103a, 103b). The side members in FIG. 2A are hollow as opposed those shown in FIG. 1. Further, an angle θ between the other portions (103a, 103b) and the impact portions (105a, 105b) are obtuse. And, as with the first and second side members (101a, 101b), the lower cross member (107) may have its own set of through holes (201a, 201b) to enable integration with other components of the vehicle.

As shown in FIG. 2A, the first and second side members (101a, 101b) extend in a substantially top (T) to bottom (B) axis. However, towards the impact portions (105a, 105b), each of these (105a, 105b) is "bent" towards a front (F) side of the vehicle as opposed to a rear (R) side of the vehicle. The impact portions (105a, 105b) are bent in such a manner so that they can be the first to make a contact and absorb forces caused in an impact. Absorbing some forces and transferring others to the other portions, the impact portions advantageously protect the cooling module (not shown) as well as other crucial components of the vehicle from damage. Furthermore, the first and second side members (101a, 101b), upon absorbing some forces, channels other forces towards stringers or girders of the vehicle, thereby decreasing direct impact/damage done to, for example, the cooling module (111).

Although FIG. 2A shows the front end structure to be substantially symmetric along a center axis $X_c$, the invention is not limited thereto. For example, whereas the first side member (101a) may be J-shaped, the second side member (101b) may be V-shaped. Specifically, numerous psychological tests have demonstrated that a driver, when in an emergency, tends to steer the wheel in a direction away from the driver. For example, when the driver is seated on the right and encounters an emergency, he or she is more likely to steer towards the left on impact than to the right. In this situation, it may be advantageous to design the second side member (101b) to be sturdier than that of the first side member (101a). And, because the impact portions (105a, 105b) are designed to make contact first with foreign objects, they (105a, 105b) may be made from sturdier objects than that of the other portions (103a, 103b). Furthermore, although not explicitly shown in FIG. 2A, shock absorbers and other materials or devices known to reduce impact force may be attached to or embedded in the impact portions of the first and second side members (101a, 101b). Of course, one of ordinary skill in the art would appreciate that such impact reducing devices may be embedded anywhere in the front end carrier and anywhere in the front end module to minimize damages caused to the cooling module and other crucial components of the vehicle.

In one or more embodiments, each of a length, width, and height of the lower cross member (107) may vary proportionally with respect to one or more of a length, width, and height of the side members (101a, 101b). Further, each of the lower cross member (107) and the two side members may be adjustable in size so that they can be fitted into vehicles of different shapes and sizes. Although not shown, the middle section joining an impact portion and an other section may be adjustable so as to alter the angle θ. And, although the through holes are disposed on certain portions of the first and second side members (101a, 101b) and the lower cross member (107), one of ordinary skill in the art would appreciate that their placement may vary depending on other components of the vehicle.

Figure 2B:
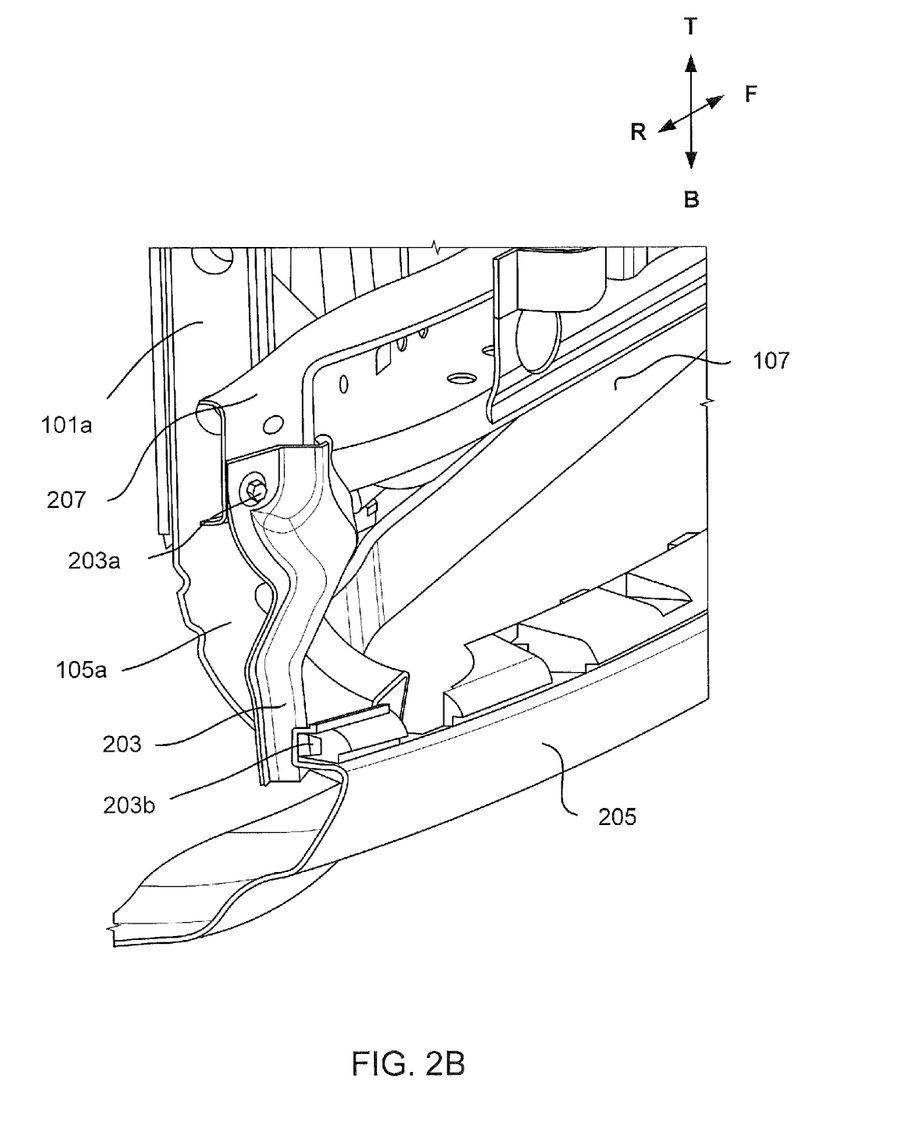
FIG. 2B shows a front end carrier according to one or more embodiments of the invention.

FIG. 2B shows a front end carrier according to one or more embodiments of the invention. Specifically, as with FIG. 2A, FIG. 2B shows a first side member (101a) having a first impact portion (105a) and a lower cross member (107). However, different from FIG. 2A, FIG. 2B additionally shows a strengthening member (203) having a first end (203a) and a second end (203b), a bumper assembly (205), and a girder (207) of the vehicle. Components that have been described will be omitted for the sake of brevity.

In one or more embodiments, the bumper assembly (205) may comprise a bumper beam and a bumper cover, which may be made from any sturdy material including but not limited to metal and plastic. The bumper assembly (205) is a structure attached to or integrated within an automobile to absorb impact in minor collisions so as to minimize repair costs. Additionally, the bumper assembly (205) is a safety mechanism that minimizes height mismatches between vehicles and protects pedestrians from injury.

In one or more embodiments, the girder (207) is a large iron or steam beam that may be a part of a frame of the vehicle. The girder (207) holds the structural integrity of the vehicle.

In one or more embodiments, the strengthening member (203) may be made of any sturdy material including metals and alloys (e.g., steel, aluminum, etc.). As shown in FIG. 2B, the strengthening member (203) contacts a side surface of the first side member (101a) and the bumper assembly (205) at the second end (203b). The strengthening member (203) also contacts the girder (207) at the first end (203a). The strengthening member (203) advantageously serves to improve the structural integrity of vehicles in crashes. Specifically, they provide additional reinforcements between the side members (101a, 101b) and the bumper assembly (205). In one or more embodiments, an increase in thickness, length, width, etc., of the strengthening member (203) with corresponding decrease in thickness, length, width, etc., of the side members (101a, 101b) may yield equal/similar protection to the front end module. Said in another way, as the size of the strengthening member (203) increases, the size of the side members (101a, 101b) while still able to adequately protect the front end module. Advantageously, this lowers the costs associated with the side members (101a, 101b).

Figure 2C:
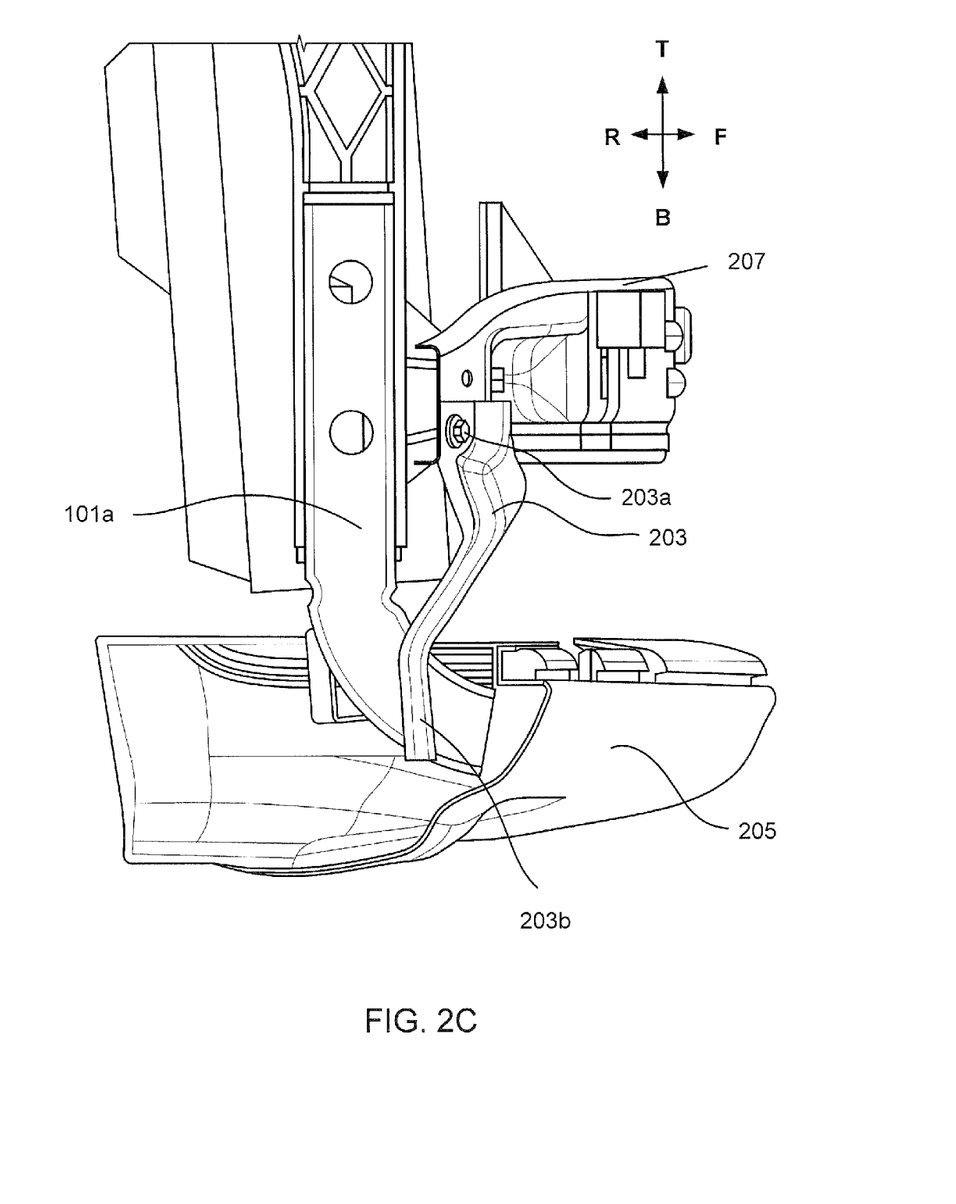
FIG. 2C shows a front end carrier according to one or more embodiments of the invention.

FIG. 2C shows a front end carrier according to one or more embodiments of the invention.

Figure 3:
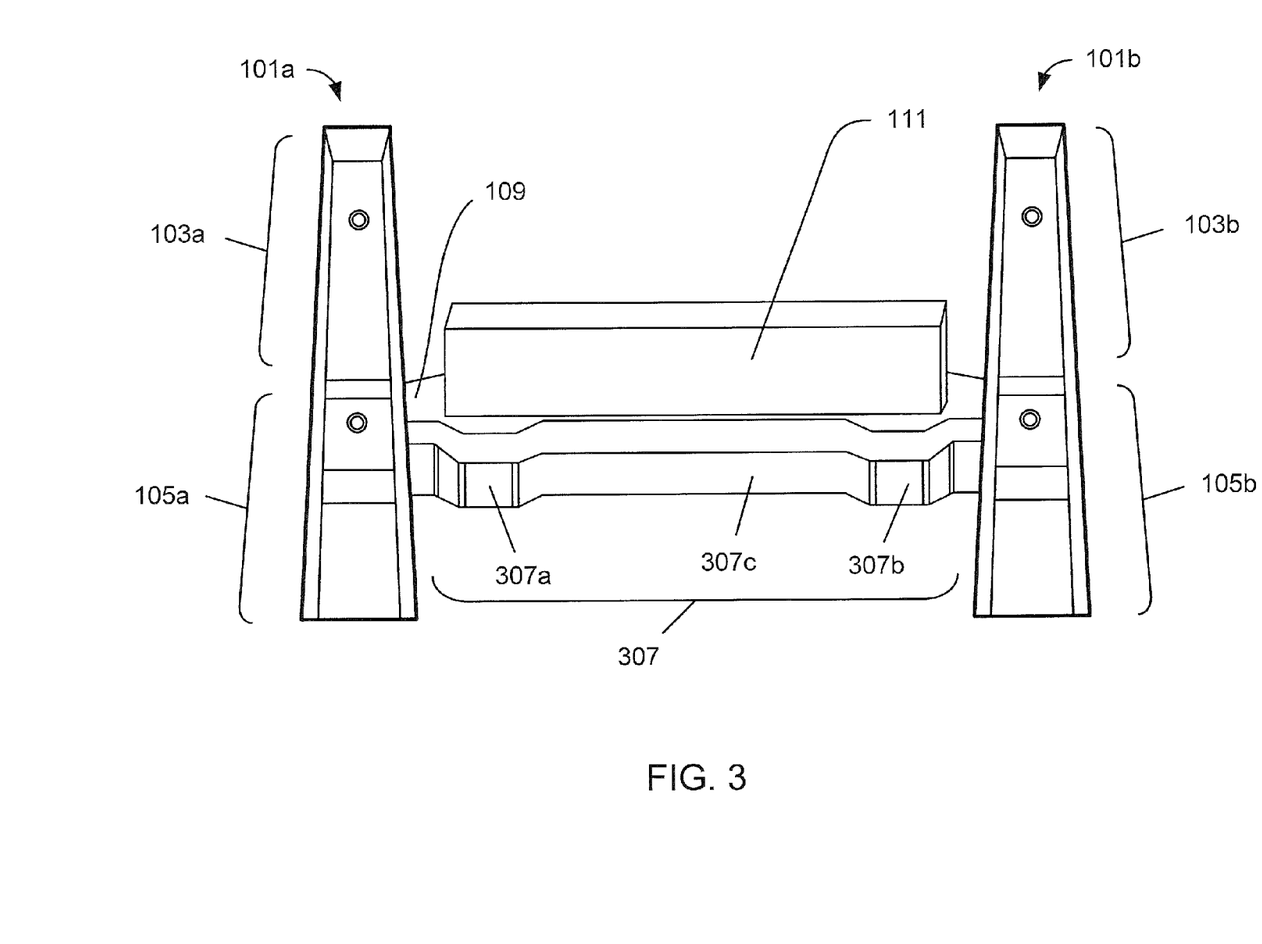
FIG. 3 shows a front end module according to one or more embodiments of the invention.

FIG. 3 shows a front end module according to one or more embodiments of the invention. FIG. 3 is substantially similar to FIG. 1. Accordingly, components that have already been described will be omitted for the sake of brevity. Differences between FIGS. 1 and 3 include the placement of the cooling module (111) and the shape and form of the lower cross member (307).

In FIG. 3, the cooling module (111) is not disposed on the lower cross member (307). Instead, the cooling module (111) is disposed on the extension (109). Advantageously, the positioning of the cooling module (111) in FIG. 3 reduces damages done on the same in an impact. However, one of ordinary skill in the art would appreciate that the cooling module (111) may be placed on the lower cross member (307) so long as other portions of the front end carrier protrude and are configured to contact foreign objects first to mitigate impact in an accident.

As also shown in FIG. 3, the lower cross member (307) is bent as opposed to the one shown in FIG. 1. In one or more embodiments, the lower cross member (307) comprises two bent portions (307a, 307b) and a straight portion (307c). In one or more embodiments, the bent portions (307a, 307b) and the impact portions (105a, 105b) may form a substantially flat surface that is substantially perpendicular to the extension (109). One of ordinary skill in the art would appreciate that bending machines may be used to bend the lower cross member (307) in any fashion—including standard bends, u-bending, offset bending, edgewise bending, torsion bending, etc.

In one or more embodiments, the bent lower cross member (307) advantageously enables car manufacturers to dispose the engine control module towards the rear (R) of the vehicle and of the two side members (101a, 101b), thereby preventing a direct contact between the cooling module (111) and the engine control module.

Figure 4:
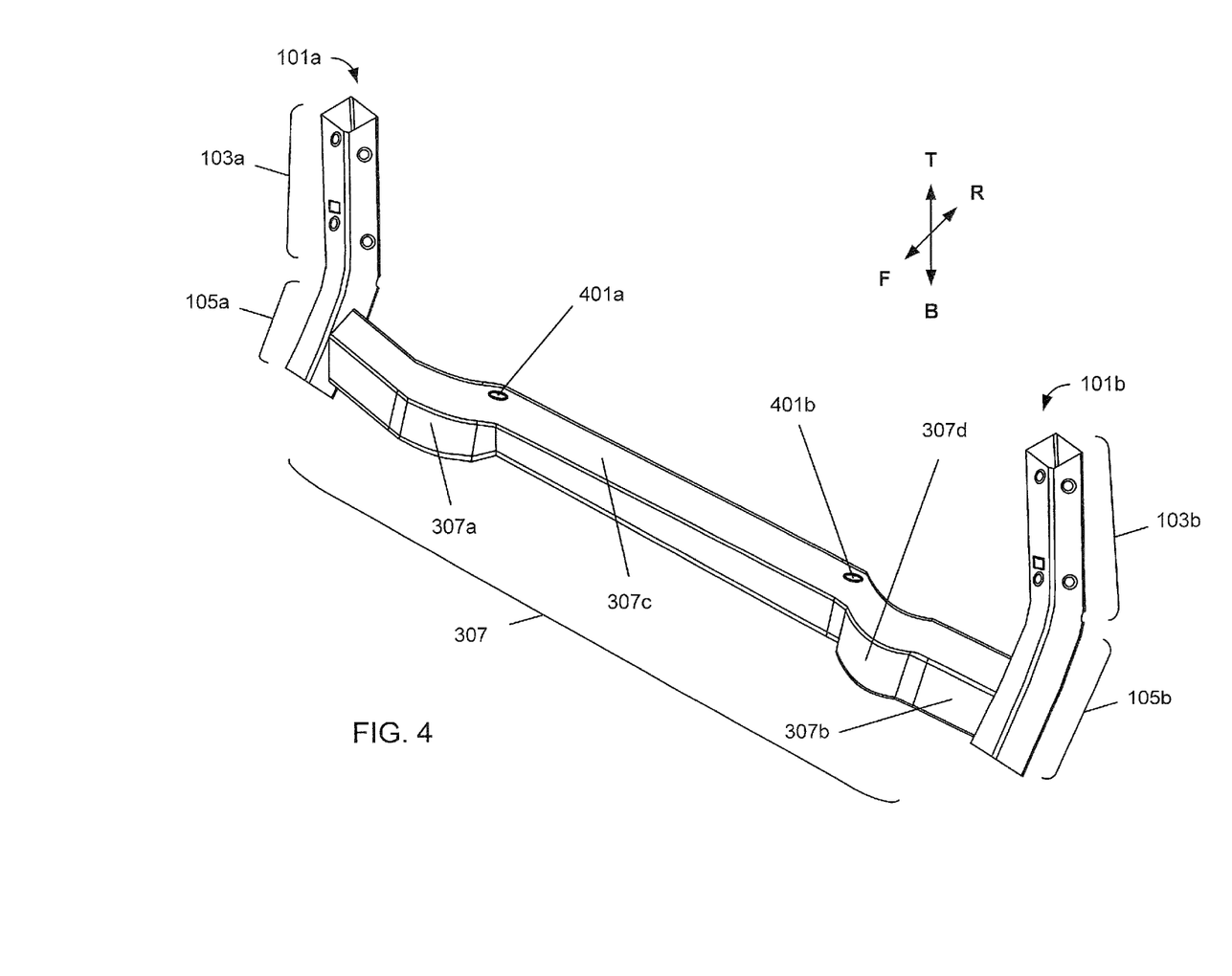
FIG. 4 shows a front end carrier according to one or more embodiments of the invention.

FIG. 4 shows a front end carrier according to one or more embodiments of the invention. FIG. 4 is substantially similar to FIG. 1. Accordingly, components that have already been described will be omitted for the sake of brevity. One difference between FIGS. 2 and 4 includes the shape and form of the lower cross member (307).

As shown in FIG. 4, the lower cross member (307) comprises two bent portions (307a, 307b) that serve to contact foreign objects first in an impact and a straight portion. In this particular figure, the bent portions (307a, 307b) do not form a flat surface with the impact portions (105a, 105b). Although the bent portions (307a, 307b) are shown to be substantially round, the invention is not limited thereto. For example, the bents of the bent portions (307a, 307b) may be characterized by sharp edges.

As another difference from FIG. 2A, FIG. 4 shows that the lower cross member (307) may comprise through holes (401a, 401b) for contact with other components of the vehicle. Although the through holes (401a, 401b) are shown to be positioned at certain locations, one of ordinary skill in the art would appreciate that they may be disposed anywhere on the lower cross member (307) without departing from the scope of the invention.

Figure 5:
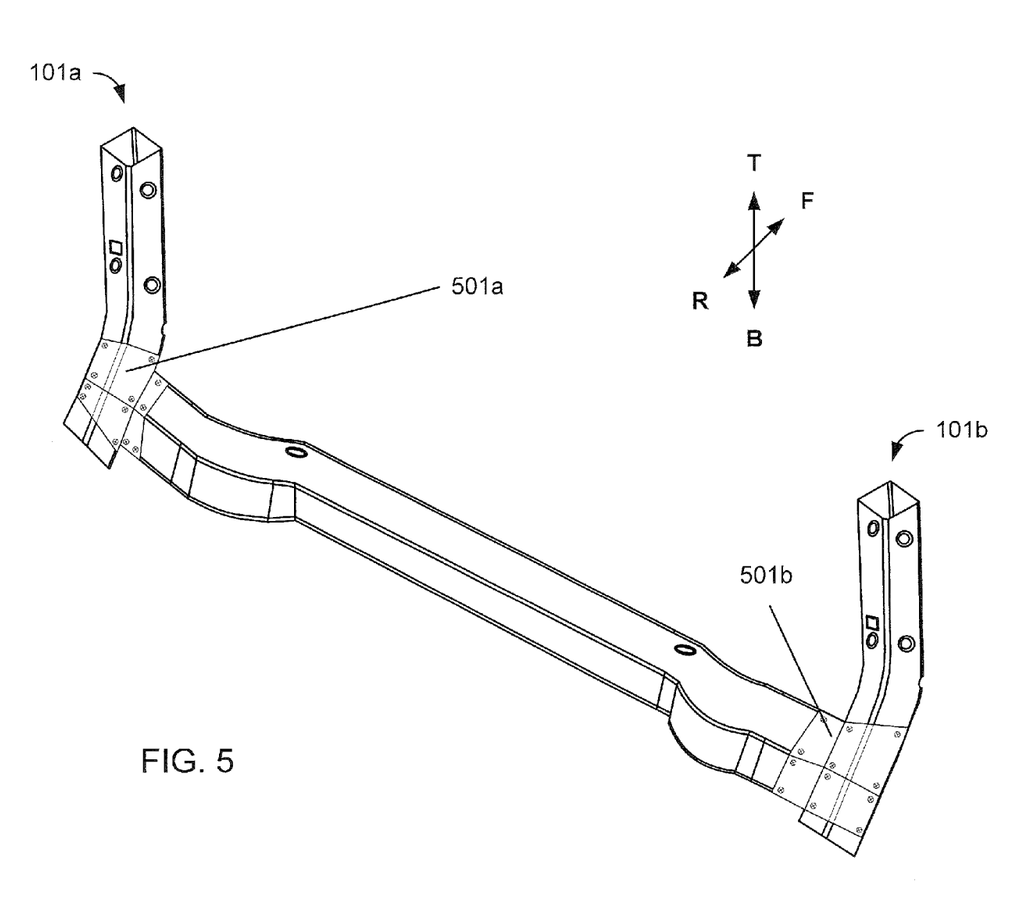
FIG. 5 shows a front end carrier according to one or more embodiments of the invention.

FIG. 5 shows a front end carrier according to one or more embodiments of the invention. Explanations of components that have already been described will be omitted for the sake of brevity.

As discussed above, the lower cross member may connect to the two side members (101a, 101b) in any fashion. However, to further bolster the connection therebetween, connectors may be used. As shown in FIG. 5, metal plates (501a, 501b) are used as connectors to further strengthen the connection between the two side members (101a, 101b) and the lower cross member.

Figure 6:
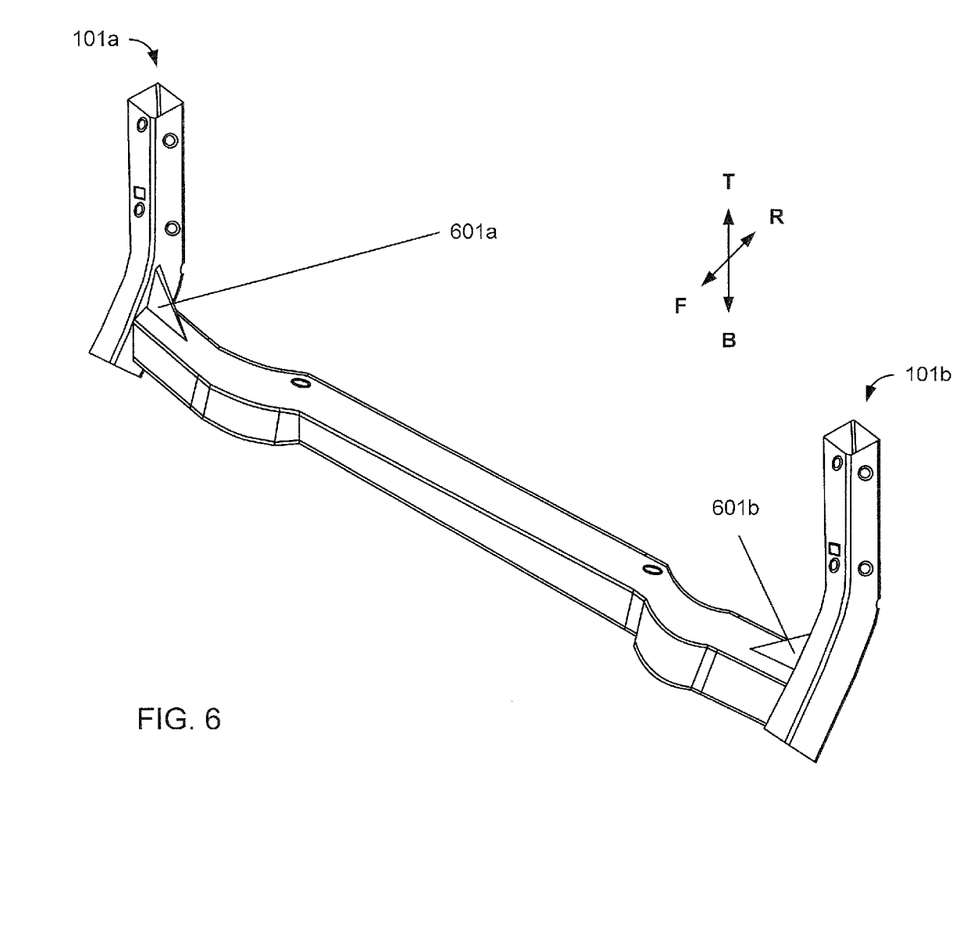
FIG. 6 shows a front end carrier according to one or more embodiments of the invention.

FIG. 6 shows a front end carrier according to one or more embodiments of the invention. FIG. 6 is substantially similar to FIG. 5. Instead of metal plates, triangular plate reinforcements (601a, 601b) are used as connectors to further strengthen the connection between the two side members (101a, 101b) and the lower cross member.

Figure 7:
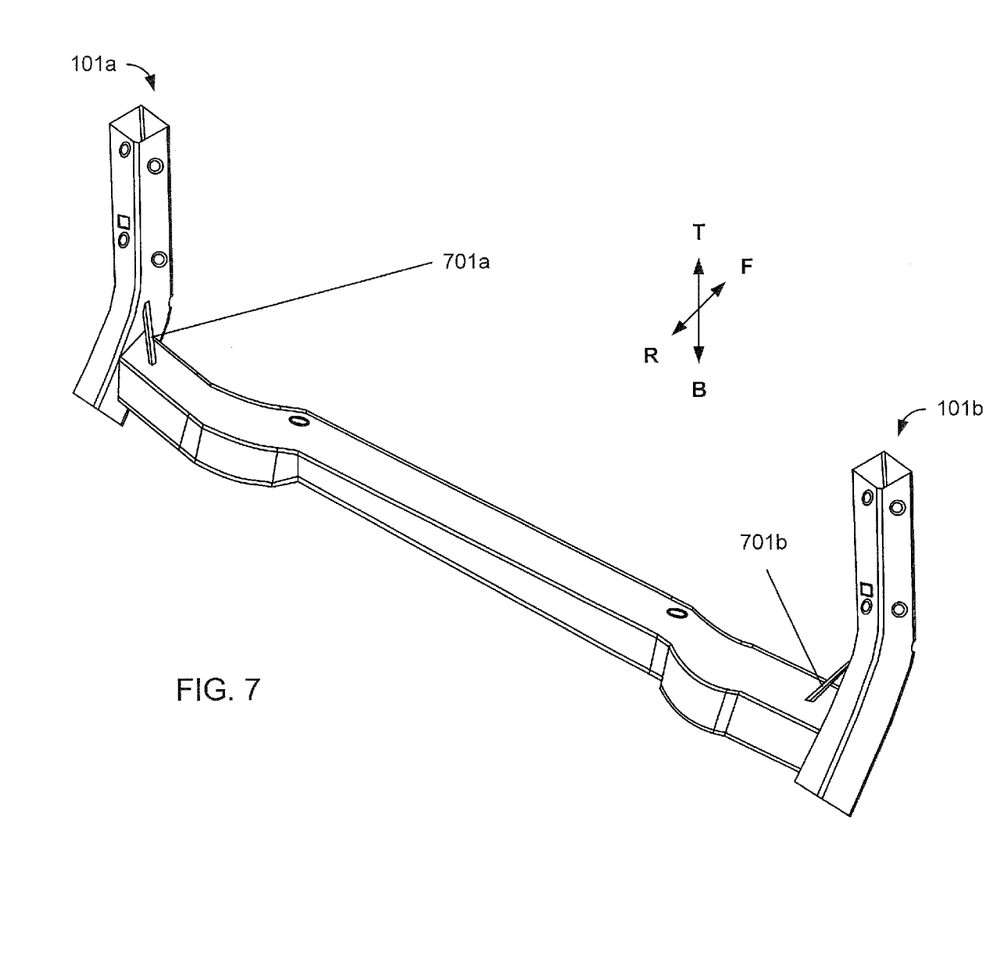
FIG. 7 shows a front end carrier according to one or more embodiments of the invention.

FIG. 7 shows a front end carrier according to one or more embodiments of the invention. FIG. 7 is substantially similar to FIG. 5. Instead of metal plates, vertical metallic links (701a, 701b) are used as connectors to further strengthen the connection between the two side members (101a, 101b) and the lower cross member.

Figure 8:
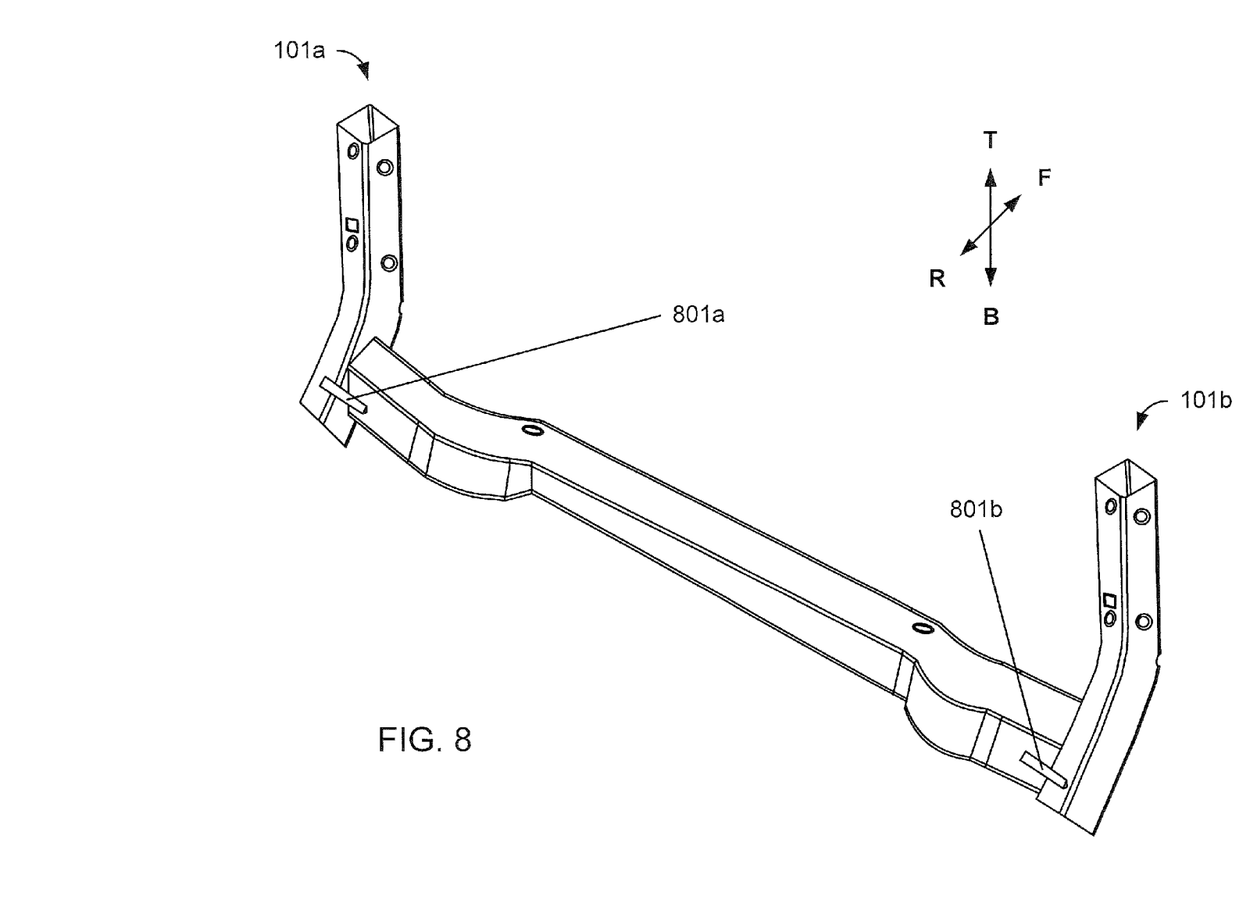
FIG. 8 shows a front end carrier according to one or more embodiments of the invention.

FIG. 8 shows a front end carrier according to one or more embodiments of the invention. FIG. 8 is substantially similar to FIG. 5. Instead of metal plates, horizontal metallic links (801a, 801b) are used as connectors to further strengthen the connection between the two side members (101a, 101b) and the lower cross member.

Although certain connectors are shown to strengthen the connection between the two side members (101a, 101b) and the lower cross member, one of ordinary skill in the art would appreciate that any connectors that could accomplish such reinforcements could be used in place of those components that have been disclosed. Furthermore, one of ordinary skill in the art would appreciate that a combination of the aforementioned connectors could be used as connectors to strength the connection between the two side members (101a, 101b) and the lower cross member.

In one or more embodiments, as the connection between the two side members (101a, 101b) and the lower cross member is strengthened, the thickness of the two side members (101a, 101b) or the thickness of the lower cross member may be decreased. Said in another way, a thickness of the lower cross member or a thickness of the two side members (101a, 101b) may vary inversely proportional to a strength of the connection.

Figure 9A:
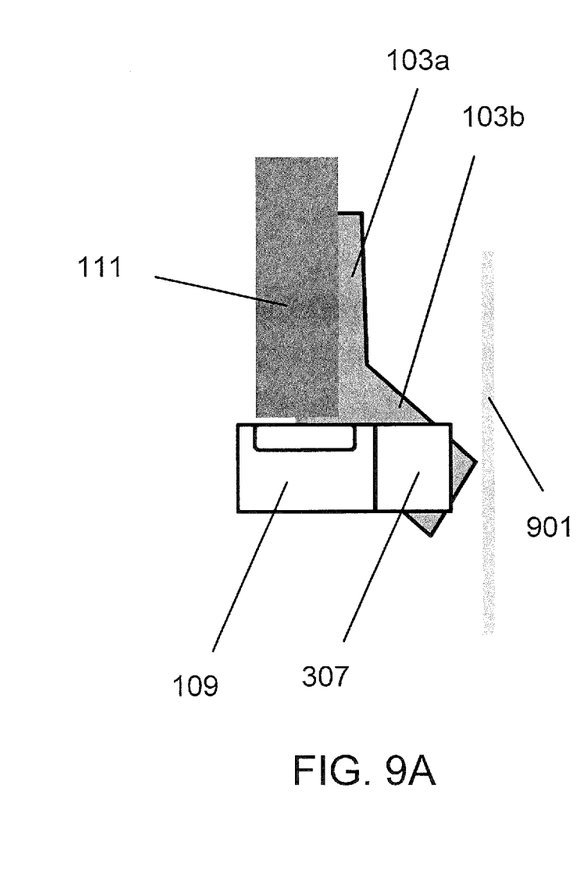
FIG. 9A shows a front end module in a pre-impact state.

FIG. 9A shows a front end module in a pre-impact state. Specifically, FIG. 9A shows a front end carrier having a lower cross member (307) and a side member having an impact portion (103b) and an other portion (103a). The extension (109) is connected to the lower cross member (307) and forms a substantially flat surface therewith. Furthermore, a cooling module (111) is mounted on the extension (109). As also shown in FIG. 9A, the impact portion (103b) of the side member and the lower cross member (307) are the first components of the front end module to make an impact with a foreign object (e.g., a wall (901)).

Figure 9B:
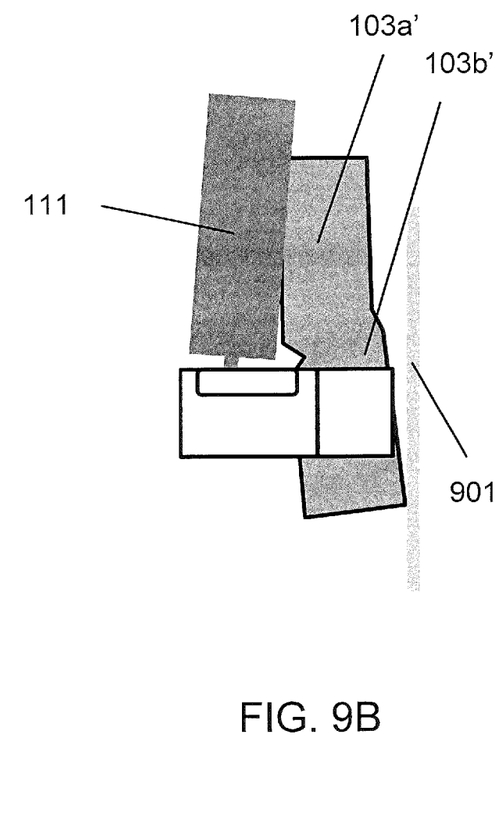
FIG. 9B shows a front end module in a post-impact state.

FIG. 9B shows a front end module in a post-impact state. After the front end module makes an impact with the wall (901), the impact portion (103b') of the side member forms a substantially flat plane with the other portion (103a') of the side member. Further, although the cooling module (111) is slightly tilted, the cooling module (111) is prevented from serious damage because of the absorption of impact forces by the bent portions of the lower cross member (307) and the impact portions (103b') of the side member.

While the invention has been described with respect to a limited number of embodiments, those skilled in the art, having benefit of this disclosure, will appreciate that other embodiments can be devised which do not depart from the scope of the invention as disclosed herein.

For example, although the figures only show that the two side members are connected by a single lower cross member, the invention is not limited thereto. Specifically, two or more cross members may be utilized to connect the two side members.

For example, although the figures only show that the two side members are connected to the lower cross member at other portions thereof, the two side members may connect to the lower cross member at respective impact portions.

For example, brackets may be added to the lower cross member to mount radiators and other components. This may be useful when there a few or no holes available in the lower cross member for connection.

For example, although FIGS. 5-8 show that the connectors on each side of the side members are the same, the invention is not limited thereto. Specifically, a first type connector (e.g., a horizontal link) may be utilized to connect the first side member (101a) to the lower cross member (307) and a second type connector (e.g., a metal plate) may be utilized to connect the second side member (101b) to the lower cross member (307).

Advantageously, the connectors according to one or more embodiments of the invention reduce the need to oversize the bolster structure, thereby reducing material costs and cumbersome installation processes. Specifically, by keeping the front end carrier the same size and adding only the connectors, the entire front end module can be strengthened and better protect components including the cooling module.

Further, by reducing other unnecessary components and creating the front end carrier using only the connectors, the side members, and the lower cross member, impact forces can be channeled to the girder, the stringer, or the bumper of the vehicle without severely damaging, for example, the cooling module.

Further, without needing to increase the size of the front end carrier for the purposes of bolstering the same, car manufacturers are able to keep the front end module, including the front end carrier, aesthetically pleasing.

Further, the bent lower cross member advantageously enables car manufacturers to place the engine control module towards the rear (R) of the vehicle and of the side members, thereby preventing a direct impact between the cooling module and the engine control module.

Furthermore, one of ordinary skill in the art would appreciate that certain "components," "modules," "units," "parts," "elements," or "portions" of the one or more embodiments of the invention are hardware components or a combination thereof that may be implemented by a circuit, processor, etc., using any known methods. Accordingly, the scope of the disclosure should be limited only by the attached claims.

What is claimed is:

1. A front end module of a vehicle, comprising:
    a first side member having a first impact portion and a first other portion;
    a second side member having a second impact portion and a second other portion;
    a lower cross member connecting the first side member with the second side member,
    wherein the first side member and the second side member are each bent towards a front end of the vehicle, and
    a strengthening member that connects to a side surface of the first side member and a bumper assembly of the vehicle at a second end of the strengthening member, and to a girder of the vehicle at a first end of the strengthening member,
    wherein the first impact portion and the second impact portion are configured to protect a cooling module in an impact by transferring impact force to the girder of the vehicle.

2. The front end module according to claim 1, wherein the lower cross member is a bent beam having at least two bent portions that are bent towards the front end.

3. The front end module according to claim 2, wherein shock absorber is attached to the at least two bent portions.

4. The front end module according to claim 1, wherein the cooling module is disposed on the lower cross member using a through hole of the lower cross member.

5. The front end module according to claim 1, further comprising an extension connecting to and forming a surface with the lower cross member, wherein the cooling module is disposed on the extension.

6. The front end module according to claim 1, wherein a length of the lower cross member is proportional to a height of the first side member or the second side member.

7. The front end module according to claim 1, wherein a plurality of lower cross members connect the first side member and the second side member.

8. The front end module according to claim 1, wherein:
    the lower cross member contacts the first side member at the first impact portion and contacts the second side member at the second impact portion, and
    a second lower cross member contacts the first side member at the first other portion and contacts the second side member at the second other portion.

9. The front end module according to claim 1, wherein an angle between the first other portion and the first impact portion is obtuse.

10. The front end module according to claim 1, further comprising a first connector that strengthens a connection between the lower cross member and the first side member and a second connector that strengths a connection between the lower cross member and the second side member.

11. The front end module according to claim 10, wherein each of the first connector and the second connector is a metal plate covering a connection region.

12. The front end module according to claim 10, wherein each of the first connector and the second connector is a triangular plate reinforcement.

13. The front end module according to claim 10, wherein each of the first connector and the second connector is at least one selected from a group consisting of: a vertical link and a horizontal link.

14. The front end module according to claim 13, wherein the horizontal link, the first side member, and the lower cross member form a gap.

15. The front end module according to claim 10, wherein a shock absorber is attached to the lower cross member to lessen damages caused to the cooling module.

16. The front end module according to claim 10, wherein a thickness ($W_C$) of the connection is inversely proportional to at least one selected from a group consisting of: a thickness ($W_1$) of the first side member, a thickness ($W_2$) of the second side member, and a thickness ($W_B$) of the lower cross member.

17. The front end module according to claim 1, wherein each of the first side member and the second side member is hollow.

18. The front end module according to claim 1, wherein each of the first side member and the second side member is at least partially J-shaped.

19. A front end module of a vehicle, comprising:
a first side member and a second side member;
a lower cross member connecting the first side member with the second side member;
a first metal plate covering a connection region comprising a portion of the first side member and a portion of the lower cross member;
a second metal plate covering a connection region comprising a portion of the second side member and a portion of the lower cross member,
wherein the first side member and the second side member are each bent toward a front end of the vehicle; and
a strengthening member that connects to a side surface of the first side member and a bumper assembly of the vehicle at a second end of the strengthening member, and to a girder of the vehicle at a first end of the strengthening member.

20. A front end module of a vehicle, comprising:
a first side member and a second side member;
a lower cross member connecting the first side member with the second side member;
an extension connecting to and forming a surface with the lower cross member; and
a cooling module disposed on the extension,
wherein the first side member and the second side member are each bent toward a front end of the vehicle, and
wherein the lower cross member is a bent beam having at least two bent portions that are bent towards the front end; and
a strengthening member that connects to a side surface of the first side member and a bumper assembly of the vehicle at a second end of the strengthening member, and to a girder of the vehicle at a first end of the strengthening member.

* * * * *